United States Patent
Barot et al.

(10) Patent No.: US 10,240,823 B2
(45) Date of Patent: Mar. 26, 2019

(54) AIR CONDITIONING SYSTEM

(71) Applicant: OxiCool, Inc., Malvern, PA (US)

(72) Inventors: Ravikant T. Barot, Phoenixville, PA (US); Jonathan William Kaufman, Leonardtown, MD (US); Stephen M. Coleman, Lusby, MD (US)

(73) Assignees: OxiCool Inc, Malvern, PA (US); The United States of America As Represented By The Secretary of the Navy, Arlington, VA (US)

( * ) Notice: Subject to any disclaimer, the term of this patent is extended or adjusted under 35 U.S.C. 154(b) by 0 days.

(21) Appl. No.: 14/856,661

(22) Filed: Sep. 17, 2015

(65) Prior Publication Data

US 2016/0033177 A1    Feb. 4, 2016

Related U.S. Application Data

(63) Continuation of application No. 12/537,852, filed on Aug. 7, 2009, now abandoned, which is a
(Continued)

(51) Int. Cl.
*F25B 17/08* (2006.01)
*F25B 15/00* (2006.01)
*F25B 27/00* (2006.01)

(52) U.S. Cl.
CPC ............ *F25B 17/083* (2013.01); *F25B 15/00* (2013.01); *F25B 27/00* (2013.01); *Y02A 30/278* (2018.01); *Y02B 30/64* (2013.01)

(58) Field of Classification Search
CPC ........ F25B 17/083; F25B 15/00; F25B 27/00; F25B 27/007; F25B 17/00; F24F 3/14; Y02B 30/64; Y02B 30/62
(Continued)

(56) References Cited

U.S. PATENT DOCUMENTS

| 620,962 A | 3/1899 | Preston |
| 651,069 A | 6/1900 | Dunn |

(Continued)

FOREIGN PATENT DOCUMENTS

| CA | 2171265 A1 | 12/1996 |
| JP | 4194561 A | 7/1992 |

(Continued)

OTHER PUBLICATIONS

The Indian Office Action dated Aug. 16, 2016 for Indian patent application No. 3962/KOLNP/2009, a counterpart foreign application of U.S. Appl. No. 12/598,156, 8 pages.
(Continued)

*Primary Examiner* — Jianying C Atkisson
*Assistant Examiner* — Raheena R Malik
(74) *Attorney, Agent, or Firm* — Lee & Hayes, P.C.

(57) ABSTRACT

An air conditioning system that includes desiccant compartments for holding a desiccant; a heat exchanger, a blower and a vessel. The heat exchanger can be filled with a heat transfer medium, while the blower blows ambient air by the heat exchanger such that the blown air is cooled and the heat exchanger is warmed such that thermal energy increases and is transferred from the air to the heat transfer medium causing the heat transfer medium to turn into vapor. The vapor is then diffused to one of the desiccant compartments such that the vapor is adsorbed onto the desiccant creating a mixture. Then an energy source is applied to the mixture such that the vapor and desiccant are separated. The separated vapor is transported to the vessel where it is condensed and then sent back to the heat exchanger, such that the system is able to be continuously operating.

26 Claims, 3 Drawing Sheets

Related U.S. Application Data continuation-in-part of application No. 12/136,288, filed on Jun. 10, 2008, now Pat. No. 7,836,723.

(58) Field of Classification Search
USPC .......................................................... 62/271
See application file for complete search history.

(56) References Cited

U.S. PATENT DOCUMENTS

| | | | |
|---|---|---|---|
| 655,736 A | 8/1900 | Reisert | |
| 656,457 A | 8/1900 | Hirsch | |
| 685,427 A | 10/1901 | Murray | |
| 693,214 A | 2/1902 | Baker | |
| 2,078,508 A * | 4/1937 | Philipp | F25B 31/006 |
| | | | 165/120 |
| 2,195,604 A | 4/1940 | Taylor | |
| 2,201,024 A * | 5/1940 | Brown, Jr. | B22D 19/0063 |
| | | | 164/94 |
| 2,532,012 A | 11/1950 | Dasher | |
| 3,064,819 A * | 11/1962 | Jones | F25B 43/003 |
| | | | 210/266 |
| 3,270,512 A * | 9/1966 | Webb | F24F 5/0046 |
| | | | 62/144 |
| 3,581,514 A | 6/1971 | Hamerski et al. | |
| 3,744,555 A | 7/1973 | Fletcher et al. | |
| 3,774,374 A | 11/1973 | Dufour et al. | |
| 4,113,004 A | 9/1978 | Rush et al. | |
| 4,180,985 A | 1/1980 | Northrup, Jr. | |
| 4,197,714 A | 4/1980 | Bradshaw | |
| 4,199,959 A | 4/1980 | Wurm | |
| 4,527,398 A | 7/1985 | Schaetzle | |
| 4,700,550 A | 10/1987 | Rhodes | |
| 4,722,099 A | 2/1988 | Kratz | |
| 4,761,968 A | 8/1988 | Basseen et al. | |
| H902 H | 4/1991 | Rousseau | |
| 5,089,119 A * | 2/1992 | Day | F25B 43/003 |
| | | | 210/167.32 |
| 5,146,757 A | 9/1992 | Dearing | |
| 5,279,503 A | 1/1994 | Propst | |
| 5,477,706 A * | 12/1995 | Kirol | C09K 5/047 |
| | | | 62/101 |
| 5,526,648 A * | 6/1996 | Wertenbach | B60H 1/00392 |
| | | | 165/104.12 |
| 5,564,124 A | 10/1996 | Elsherif et al. | |
| 5,660,048 A | 8/1997 | Belding et al. | |
| 5,732,569 A | 3/1998 | Sanada et al. | |
| 5,768,908 A | 6/1998 | Tanaka et al. | |
| 6,029,462 A | 2/2000 | Denniston | |
| 6,199,389 B1 | 3/2001 | Maeda | |
| 6,209,622 B1 | 4/2001 | Lagace et al. | |
| 6,240,742 B1 | 6/2001 | Kaufman et al. | |
| 6,318,106 B1 | 11/2001 | Maeda | |
| 6,510,696 B2 | 1/2003 | Guttman et al. | |
| 6,557,365 B2 | 5/2003 | Dinnage et al. | |
| 6,564,571 B2 | 5/2003 | Feeney | |
| 6,854,279 B1 | 2/2005 | Digiovanni et al. | |
| 6,932,148 B1 | 8/2005 | Brummett et al. | |
| 7,114,266 B2 * | 10/2006 | Gomes | F24F 3/1411 |
| | | | 34/210 |
| 7,120,938 B2 | 10/2006 | Ichigaya | |
| 7,152,421 B2 | 12/2006 | Parks et al. | |
| 7,836,723 B2 * | 11/2010 | Kaufman | F25B 17/083 |
| | | | 62/480 |
| 8,739,566 B2 * | 6/2014 | Barot | B62J 33/00 |
| | | | 62/238.3 |
| 2003/0136140 A1 | 7/2003 | Maeda et al. | |
| 2004/0000152 A1 | 1/2004 | Fischer | |
| 2005/0091988 A1 | 5/2005 | Stewart et al. | |
| 2005/0150378 A1 | 7/2005 | Dunne et al. | |
| 2005/0161193 A1 | 7/2005 | McKenzie et al. | |
| 2005/0172655 A1 | 8/2005 | Naaman | |
| 2005/0214609 A1 | 9/2005 | McElroy | |
| 2006/0191270 A1 | 8/2006 | Warren | |
| 2006/0254290 A1 * | 11/2006 | Michalski | F25B 17/086 |
| | | | 62/101 |
| 2007/0028769 A1 | 2/2007 | Eplee et al. | |
| 2007/0079623 A1 | 4/2007 | Inaba et al. | |
| 2010/0043462 A1 | 2/2010 | Barot et al. | |
| 2010/0132391 A1 | 6/2010 | Barot | |
| 2014/0216089 A1 | 8/2014 | Barot | |

FOREIGN PATENT DOCUMENTS

| | | | |
|---|---|---|---|
| JP | 05126432 A | 5/1993 | |
| JP | 2002081689 A | 3/2002 | |
| JP | 2004237816 A | 8/2004 | |
| JP | 2005076168 A | 3/2005 | |

OTHER PUBLICATIONS

PCT Search Report & Written Opinion for Application No. PCT/US2008/062118, dated Mar. 25, 2009, 11 pages.
Office action for U.S. Appl. No. 14/259,235, dated Oct. 23, 2015, Barot, "Motor Cycle Air Conditioning System", 15 pages.
Office action for U.S. Appl. No. 12/598,156, dated Dec. 20, 2013, Barot, "Motor Cycle Air Conditioning System", 14 pages.
Office action for U.S. Appl. No. 12/537,852, dated Dec. 6, 2013, Barot, "Air Conditioning System", 11 pages.
Office action for U.S. Appl. No. 12/598,156, dated Mar. 12, 2013, Barot, "Motor Cycle Air Conditioning System", 14 pages.
Office action for U.S. Appl. No. 12/537,852, dated Mar. 18, 2015, Barot, "Air Conditioning System", 11 pages.
Office action for U.S. Appl. No. 12/598,156, dated Jul. 17, 2012, Barot, "Motor Cycle Air Conditioning System", 17 pages.
Office action for U.S. Appl. No. 12/537,852, dated Jul. 6, 2012, Barot, "Air Conditioning System", 21 pages.
Office action for U.S. Appl. No. 12/537,852, dated Dec. 6, 2013, Barot, "Air Conditioning System", 31 pages.
Wang, "Adsorpotion Refrigeration: A survey of Novel technologies," Feb. 2007, Recent Patents on Engineering, vol. 1, No. 1, pp. 1-21. Abstract.
The Hearing Notice dated Sep. 11, 2017 for Indian patent application No. 3962/KOLNP/2009, a counterpart foreign application of U.S. Pat. No. 8,739,566, 2 pages.
The Indian Office Action dated Jun. 13, 2018 for Indian Patent Application No. 546/CHENP/2012, 6 pages.

\* cited by examiner

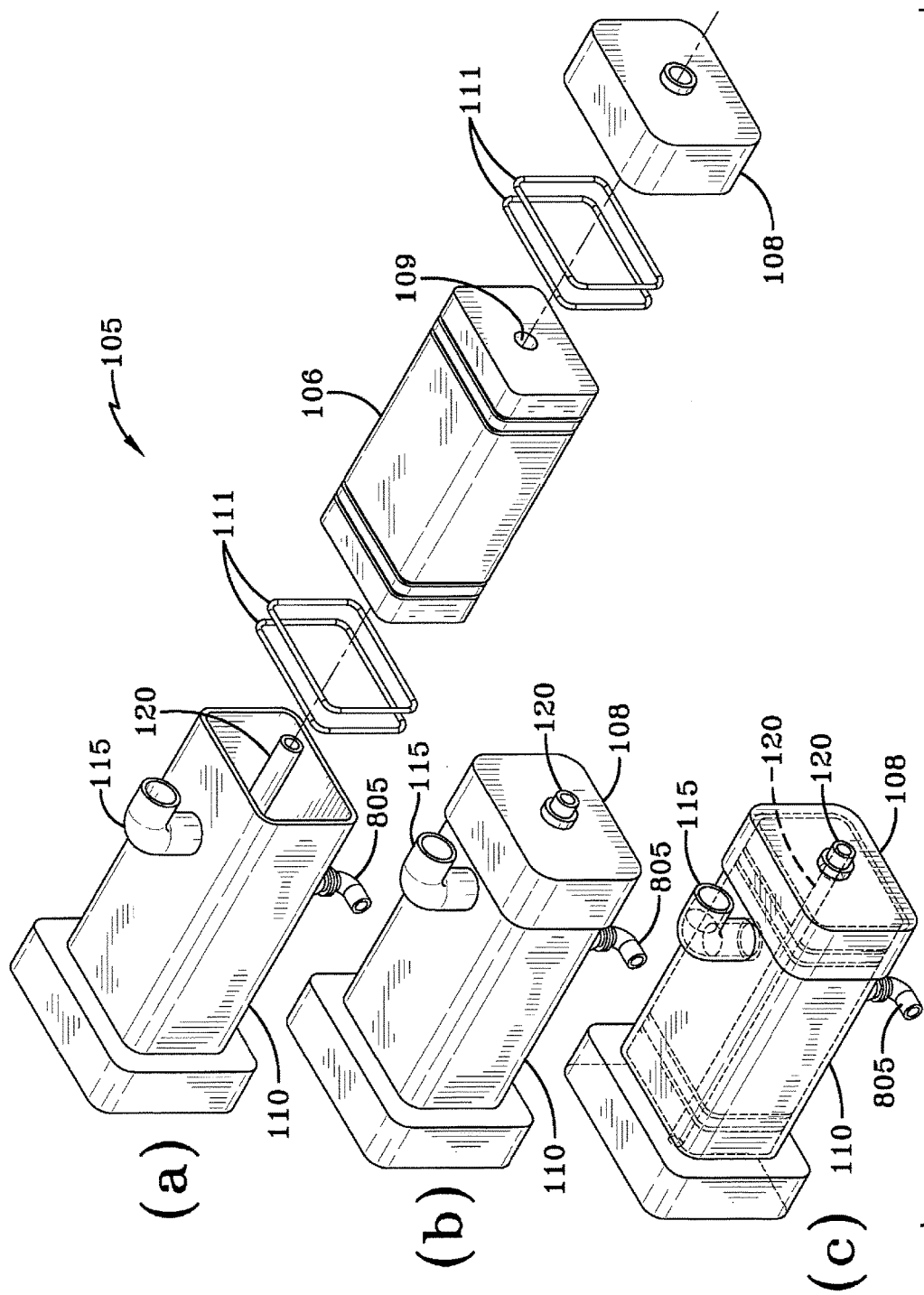

AIR CONDITIONING SYSTEM

CROSS REFERENCE TO RELATED APPLICATIONS

This application is a continuation of U.S. patent application Ser. No. 12/537,852, filed Aug. 7, 2009, which is a continuation-in-part of U.S. patent application Ser. No. 12/136,288, now U.S. Pat. No. 7,836,723, filed Jun. 10, 2008, each of which is hereby incorporated by reference in its entirety.

STATEMENT OF GOVERNMENT INTEREST

The invention described herein may be manufactured and used by or for the Government of the United States of America for governmental purposes without payment of any royalties thereon or therefor. The technology described herein was a subject invention under Cooperative Research and Development Agreement NCRADA-NAWCADPAX-07-121-A01 with OxiCool, Inc.

TECHNICAL FIELD

The present invention relates to an air conditioning system.

BACKGROUND

When sleeping at night, drivers of large trucks that operate over long distances and travel for many days often utilize sleeper compartments built into their truck cabin. This reduces the cost of lodgings while allowing truckers to sleep in rest areas on highways, thereby eliminating the need to detour off their routes to find and return from overnight lodging. Maintaining comfortable cabin temperatures during warm evenings, however, often means running the truck engine throughout the night to power the truck air conditioner. This uses considerable fuel, decreases engine life by continual operation, provides a continual source of environmental pollutants, and diminishes driver health by exposing the driver to elevated levels of the pollutants during sleep. In addition, the continuous vibration increases mechanical fatigue on truck tractor components, thereby decreasing time between repairs. Not running a truck air conditioner can lead to increased driver fatigue due to poor sleep or increased operating costs (use of motels/hotels).

Military vehicles such as tanks or armored personnel carriers must also run vehicle engines or auxiliary power units to maintain internal air conditioning. Providing an auxiliary cooling system that does not rely on diesel fuel presents a smaller infrared signature and improves battlefield survivability.

SUMMARY

The present invention is directed to a continuous cooling air conditioning system. The present invention provides for the continuous cooling of various fluids, such as but not limited to, air from the cabin of a vehicle.

In an exemplary and non-limiting configuration, a first chamber is in cooling mode to provide for cooling of a fluid whereas a second chamber is in recharging mode to prepare for operation in the cooling mode. As the first chamber finishes the adsorption process, thus nearing the end of its cooling capabilities, the second chamber is brought online in a cooling mode of operation to continue the cooling process. Thus, a seemingly continuous cooling process is provided for by the present invention. Further, in some configurations, because a plurality of desiccant chambers are handling the cooling load, it may be possible to reduce the size of the desiccant chambers. In one exemplary and non-limiting example, the desiccant used is zeolite and the refrigerant is water.

An exemplary system may include at least two chambers having a desiccant in each chamber, at least one heat exchanger, a first fluid inlet to be cooled, and a second fluid inlet used to heat the desiccant to cause the desorption of the refrigerant from the desiccant. The exemplary system may also include a condenser for cooling and condensing the refrigerant after desorption from the desiccant. In one exemplary embodiment, the heat exchanger is configured to remove heat from the fluid to be cooled through the use of an expansion valve. As the refrigerant enters the heat exchanger, the expansion value provides for the vaporization of the liquid refrigerant entering the heat exchanger. The heat of vaporization is supplied by the fluid to be cooled. The vaporized refrigerant is adsorbed by the desiccant in the first chamber operating in the cooling mode. The second fluid is used to heat the desiccant in the second chamber to cause the water vapor to be desorbed. The water vapor is then cooled and condensed for use back in the heat exchanger.

It is a feature of the present invention to provide an air conditioning system that is able to be utilized in a vehicle and is able to operate independently of a vehicle engine.

It is a feature of the present invention to provide an eco-friendly air conditioning system that can operate effectively for an extended period of time.

It is an additional feature of the present invention to provide an air conditioning system that provides continuous cooling to an enclosed space utilizing a forced convection system based on desiccant based adsorption.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Other features of the subject matter are described below.

BRIEF DESCRIPTION OF THE DRAWINGS

These and other features, aspects and advantages of the present invention will become better understood with reference to the following description and appended claims, and accompanying drawings. For the purpose of illustrating the subject matter, there are shown in the drawings exemplary embodiments of the subject matter; however, the presently disclosed subject matter is not limited to the specific methods, compositions, and devices disclosed. In addition, the drawings are not necessarily drawn to scale. In the drawings:

FIG. 3 is an exemplary and non-limiting perspective view of another embodiment of the desiccant compartment, which shows an exploded perspective view of the desiccant compartment in (a), a perspective view of that embodiment in (b); and a perspective view showing the internal portion of that embodiment in (c).

DETAILED DESCRIPTION OF ILLUSTRATIVE EMBODIMENTS

The present subject matter may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

Disclosed herein is a fluid cooling system that provides for essentially or apparently constant cooling of the fluid and, in some configurations, a reduction in size of certain components of the invention. In an example, one desiccant chamber is in a cooling mode of operation whereas a second chamber is being prepared for the cooling mode through the application of heat to drive off the adsorbed water vapor from a prior cooling cycle, is in a recharging mode. Once the chamber in the cooling mode has adsorbed enough water vapor to either be ineffective at adsorption or the rate of adsorption has decreased below a specified minimum rate, the chamber in the cooling mode is reconfigured to be in the recharging mode and the chamber in the recharging mode is configured to be in the cooling mode, which may or may not occur simultaneous or in any specific order.

The desiccant may be defined as, but without limitation, a drying agent. Examples of desiccant that can be utilized are, without limitation, amorphous silica gel, diatomaceous earth, calcium aluminosilicate clay, molecular sieves and activated carbon. The following description uses zeolite as the desiccant by way of example only. A zeolite may be described, but without limitation, as hydrous aluminum silicate in porous granules. Possible zeolites that can be utilized are, but without limitation, analcime, chabazite, heulandite, natrolite, phillipsite, and stilbite.

Figure 1:
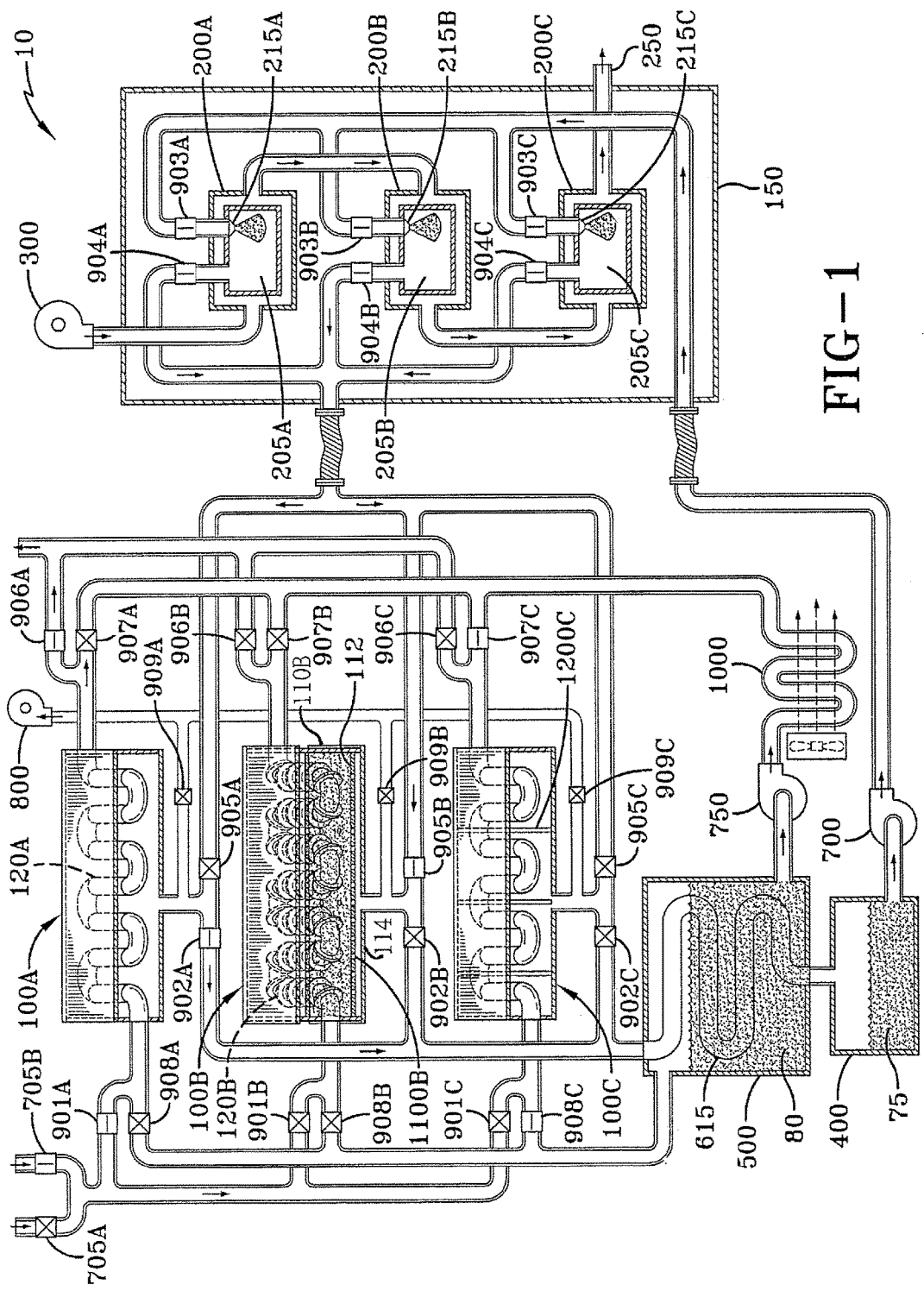
FIG. 1 is an exemplary and non-limiting side view of an embodiment of the air conditioning unit.

A non-limiting system of the present subject matter is shown in FIG. 1. The system of FIG. 1 may be mounted in various places of a vehicle such as, but without limitation, the rear of a truck sleeper compartment, at or near the undercarriage of the vehicle, or any location or position practicable. In the exemplary and non-limiting system of FIG. 1, the desiccant used is zeolite and the refrigerant used is water, though it should be understood that the present invention is not limited solely to zeolite or water, or the combination of zeolite and water, as other appropriate desiccants and refrigerants may be used.

In FIG. 1, in an exemplary configuration, zeolite chamber 100A is in recharging mode, zeolite chamber 100B is in cooling mode, and zeolite chamber 100C is in standby mode. It should be noted that the present invention is not limited to two chambers and may include more than two desiccant chambers depending upon the load conditions of the system or other factors. For example, in the present invention, zeolite chamber 100C may be used to augment or supplement the vapor adsorption capabilities of zeolite chamber 100B while in cooling mode (or zeolite chamber 100A when it is in cooling mode). Further, zeolite chamber 100C may be used as a backup should either or both zeolite chambers 100A and/or 100B fail or be unusable for the particular purpose.

Each zeolite chamber may be, without limitation, a tank, container, receptacle or structure for holding a solid, liquid or gas. The zeolite chambers may be manufactured from any material practicable. FIG. 1 shows three zeolite chambers, 100A, 100B, and 100C; however, as discussed above, the system of FIG. 1 may utilize as little as two zeolite chambers and as many as required or desired. Zeolite chambers 100A, 100B and 100C may be configured to provide for the transfer of water from the zeolite. Zeolite chambers 100A, 100B and 100C may include perforations (not shown) to facilitate the free and efficient movement of the vapor. Zeolite chamber 100B includes a compartment wall 110B and compartment tubing, snaking tube, 120B. In one of the embodiments, the compartment wall 110 may include an outer skin 114 and an inner skin 112, which together create an air channel. Inner skin 112 may also include perforations 110OB, which may be used to keep the zeolite in zeolite chamber 100B while providing for the transfer of water vapor. Perforated tubes, shown as tube 1200C of zeolite chamber 100C may be used to facilitate the movement of water vapor as well.

Figure 2:
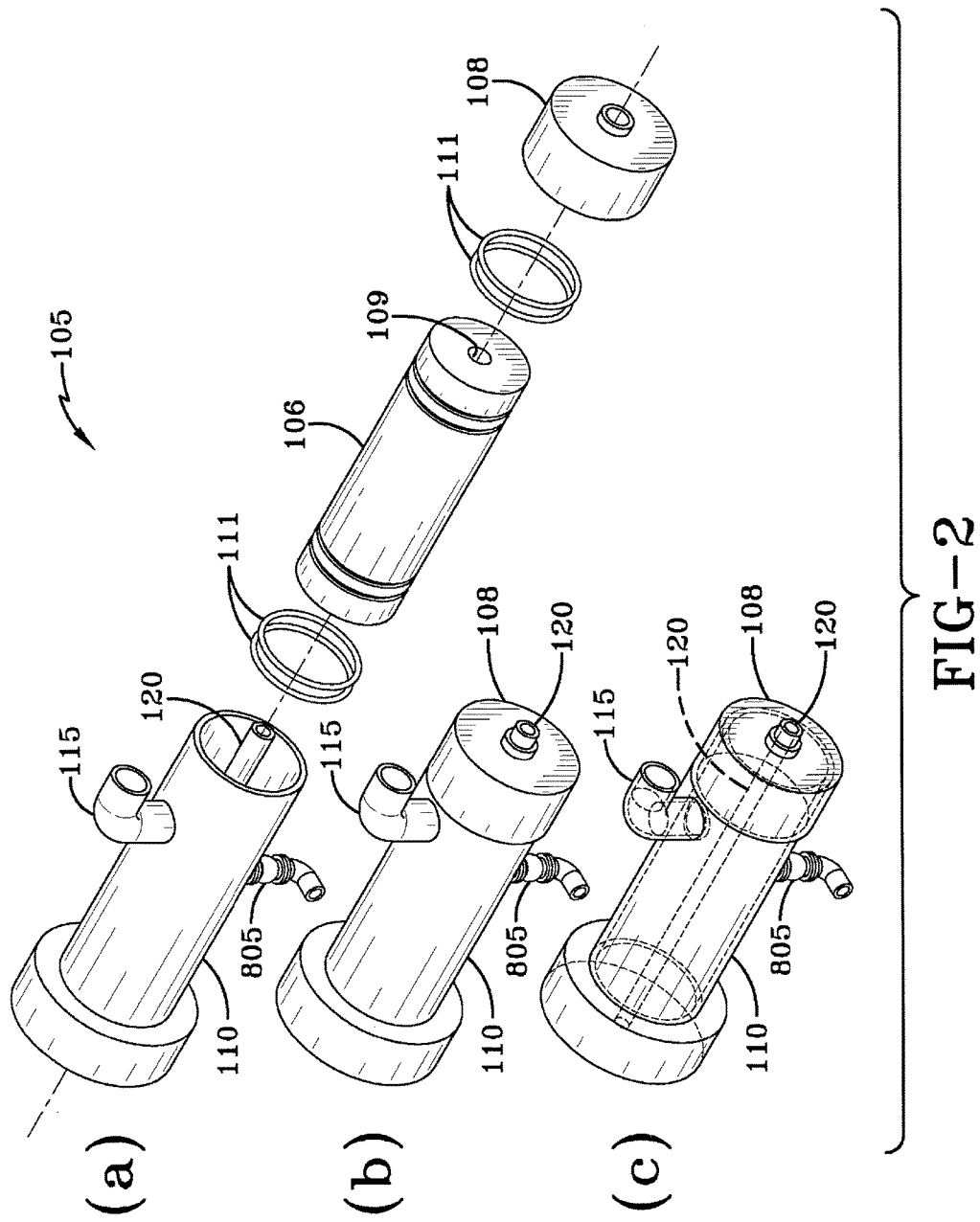
FIG. 2 is an exemplary and non-limiting perspective view of another embodiment of the desiccant compartment, which shows an exploded perspective view of the desiccant compartment in (a), a perspective view of that embodiment in (b); and a perspective view showing the internal portion of that embodiment in (c).

Snaking tube 120B may be configured to prevent the intermixing of the contents of snaking tube 120B with the vapor and/or desiccant disposed within the zeolite chamber IOOB. Snaking tube 120B may include valves to control the flow of any fluids in snaking tube 120B. Snaking tube 120B may be manufactured from any type of material that is practicable. Snaking tube 120B may pass through zeolite chamber IOOB in a straight line or in a serpentine manner as shown in FIGS. 1 and 2. As shown in FIG. 1, the tubing may include rings 111 disposed around the circumference of the snaking tube 120B to increase heat transfer. Zeolite chamber IOOB may be comprised of replaceable desiccant cartridge 105 that can be removed or attached. Desiccant cartridge 105 is discussed in more detail with regards to FIGS. 2 and 3, below.

In the exemplary system of FIG. 1, pump 300 pulls air, the fluid to be cooled, from the cabin of a vehicle into the system of FIG. 1. The air circulates around heat exchangers 200A, 200B and 200C and is cooled prior to being released back into the cabin through air outlet 250. It should be noted that, although not specifically shown in FIG. 1, the system of FIG. 1 may be configured to provide for cooling by one or more than one heat exchanger. The use of the three heat exchangers, 200A, 200B and 200C, is for exemplary purposes only. The exiting coolant air at 250 could be blown directly where cooling is required. Alternately, a cooling fluid could be used which is then circulated in an auxiliary heat exchanger and blower combination to provide cooling where required. If air is used, heat exchanger 200A may be optimized to dehumidify the air and then heat exchangers 200B and 200C are configured to lower the air temperature in stages. Heat exchangers 200A, 200B and 200C may be manufactured from an aluminum alloy with an inner nickel coating; however, heat exchangers 200A, 200B and 200C may be manufactured from any type of material practicable.

Heat exchangers 200A, 200B and 200C along with any corresponding piping and valves may be calibrated such that they correspond with the number and size of zeolite chambers 100A, 100B and 100C. Heat exchangers 200A, 200B and 200C may be computer controlled. Heat exchangers 200A, 200B and 200C may include boiling chambers 205A, 205B and 205C and a shell 210. Heat exchangers 200A, 200B and 200C may also include injectors or spray nozzles 215A, 215B, and 215C for spraying the refrigerant, water, into boiling chamber 205A, 205B and 205C of heat exchangers 200A, 200B and 200C, respectively.

Heat exchangers 200A, 200B and 200C cool the air through the expansion of a refrigerant, in this example water, into a larger volume, whereas the heat in the air to be cooled is transferred to the refrigerant to expand and vaporize the refrigerant. In the present example, the system of FIG. 1 is run under vacuum, or partial vacuum, to provide for the vaporization of water at temperature ranges that may exist in the air of a cabin, i.e. room temperatures, in the present example, vacuum pump 800 is used to evacuate zeolite chambers 100A, 100B and 100C, as well as the rest of the system, via values 909A, 909B and 909C, respectively.

The refrigerant 75, in this example, water, is pumped in liquid form from reservoir 400 into heat exchangers 200A, 200B and 200C by pump 700. Cooling inlet values 903A, 903B and 903C may be opened, either separately or in combination, and at various apertures, to introduce the refrigerant 75 into the expansion chambers of each of heat exchangers 200A, 200B and 200C via spray nozzles 215A, 215B, and 215C. Cooling inlet values 903A, 903B, and 903C may be opened or closed, or their apertures adjusted, to control the amount of water entering the expansion chambers to control the amount of cooling of the air. Further, it may be preferable to house heat exchangers 200A, 200B and 200C in an enclosure such as enclosure 150. Enclosure 150 may also have insulation to help with the efficiency of the system. In other words, the insulation may help reduce the amount of ambient heat removed, which may be the engine compartment, rather than the heat from the fluid intended to be cooled, such as the air in a cabin of a vehicle.

As with other components of the present invention, the system of FIG. 1 may also be a modular system. In other words, various components may be placed within an enclosure, such as enclosure 150, to allow for interchangeability of various component parts. For example, the system may be comprised of a heat exchanger module (not shown), a zeolite chamber module (not shown) and a condenser and reservoir module (not shown). Each module may have contained within the module the components of FIG. 1 described herein. It should be noted that the module designations and functionality is for exemplary purposes only.

Cooling outlet valves 904A, 904B and 904C are opened to allow the now vaporized refrigerant to travel to the particular zeolite chambers operating in the cooling, or adsorption, mode. In the present example, zeolite chamber 100B is in cooling mode, thus valve 905B is open to allow the water vapor to enter zeolite chamber 100B while values 905A and 905C are closed to prevent water vapor from entering zeolite chambers 100A and 100C, respectively. if zeolite chamber 100B is switched from cooling to recharging mode, 905B is closed. To provide for continuous cooling of the fluid to be cooled, 905A or 905C may be opened to switch zeolite chamber 100A or 100C, respectively, to cooling mode contemporaneously with the switching of zeolite chamber 100B to recharging mode. The present invention is not limited to continuous cooling. In other words, there may be delay in switching a zeolite chamber from recharging to cooling mode.

While in recharging mode, energy is applied to the desiccant in zeolite chamber 100A to cause the desorption of water vapor from the desiccant. Various energy sources may be used, in the system of FIG. 1. In the present example, heat is energy source. If heat is used, it can be, but without limitation, external heat, solar heat, waste engine heat or heat from an auxiliary heating unit such as a diesel heater. In the present example, engine exhaust heat is used.

As shown in FIG. 1, the engine exhaust heat enters the system of FIG. 1 via value heat inlet value 705B, then moves toward and into the compartment tubing of the particular zeolite chamber to be heated. Because zeolite chamber 100A is in recharging mode, valve 901A and value 906A are opened. Valve 901B/906B and 901C/906C control entry of the heat into zeolite chambers 100B and 100C, respectively. Other heat sources may be used. By way of example, valve 705A is used to control the entry of diesel heater heat to the chambers.

The separated vapor is then diffused toward cooling reservoir 500, through the coolant 80 within the coolant reservoir 500 where the vapor is cooled and condenses, and then is transported to reservoir 400 to await being transported back to the heat exchangers 200A, B, C to continue the cycle. This may be computer controlled via a valve system. The zeolite chamber 100A must be recharged and this is done by heating the mixture and creating desorption of vapor from the desiccant 50, then cooling the desiccant 50. Zeolite is the preferred desiccant 50 and desorption occurs when the zeolite reaches a certain temperature, and is unable to adsorb the vapor. To heat the zeolite in the particular chamber, the heat is circulated through the zeolite via snaking tubes 120A, 120B and 120C for zeolite chambers 100A, 100B and 100C, respectively.

Once the water has been driven from the zeolite, or at least to a desired amount, the zeolite is cooled in preparation for the next time the zeolite chamber is in cooling mode. Although the zeolite can be cooled using various means, including ambient cooling, to increase the rate of cooling, a coolant may be used. In the present example, once zeolite chamber 100A is ready to be cooled, valves 901A, 902A and 906A are closed and valves 907A and 908A are opened. Cooling for zeolite chambers 100B and 100C may be provided by manipulation of valves 901B/902B/906B/907B/908B and 901C/902C/906C/907C/908C, respectively. Coolant 80, examples of which may be, without limitation, water, air, glycol, is pumped through snaking tube 120A of zeolite chamber 100A by pump 750. Coolant 80 is cooled by cooler 1000, which in some configurations may transfer the heat from coolant 80 to ambient air. Although a single condenser 1000 is shown by way of illustration, it should be understood that condenser 1000 may be one or more condenser units. Further, the position of condenser 1000 is merely exemplary, as one or more cooling units may be placed either before or after, or both, coolant reservoir 500.

Coolant reservoir 500 is configured to both act as a reservoir tank for coolant 80 and to provide contact between coolant 80 and the desorbed water vapor via tubing 615, thus cooling and condensing the water vapor, which is then stored in reservoir 400. The zeolite chambers 100A, 100B and 100C can be sized such that each can provide cooling for a time period allowing the previously used desiccant compartment to recharge. In times of heavy load, the zeolite chambers may be unable to dissipate heat effectively. In that case, some of the coolant 80 will be channeled to the chamber in cooling mode. In this case, when 100C is in cooling mode, valves 907C and 908C will be partially open to transfer heat from zeolite to the coolant 80.

As mentioned above, one or more components of the system of FIG. 1 may be disposed within an enclosure. Alternatively, the system of FIG. 1 may be within a combination of two or more enclosures.

FIG. 2 is an illustration of an exemplary desiccant cartridge that may be used in zeolite chambers 100A, 100B and 100C. In FIG. 2, a replaceable desiccant cartridge 105 is shown. Desiccant cartridge 105 houses the desiccant and may be configured to be removable or detachable. Desiccant cartridge 105 may have a circular cross section, as shown in FIG. 2 or a rectangular or square cross section as shown in FIG. 3. As discussed earlier, snaking tube 120B within the desiccant cartridge 105 may be straight (such as tube 120 shown in FIGS. 2 and 3) or serpentine (FIG. 1). As shown in FIGS. 2 and 3, the desiccant cartridge 105 may include a compartment wall 110 or shell as previously described, a desiccant case 106 (containing the desiccant 50) disposed within the compartment wall 110, rings a cap 108, and a compartment tubing aperture 109. Rings 111 may be used to increase the heat transfer to and from desiccant cartridge 105. The desiccant cartridge 105 can also include a piping inlet 115 that connects the desiccant cartridge 105 to the desorption vapor piping and the vapor piping.

Although the present invention has been described in considerable detail with reference to certain preferred embodiments thereof, other embodiments are possible. Therefore, the spirit and scope of the appended claims should not be limited to the description of the preferred embodiments contained herein.

What is claimed is:

1. An air conditioning system, comprising:
   a first desiccant chamber initially configured to operate in a cooling mode and a second desiccant chamber initially configured to operate in a recharging mode, wherein the cooling mode provides for adsorption of a refrigerant in vapor form and the recharging mode provides for the desorption of the vapor, wherein the refrigerant comprises water in the first desiccant chamber and the second desiccant chamber;
   at least one heat exchanger configured to vaporize the refrigerant in liquid form into the vapor by absorption of heat from a fluid to be cooled, wherein a heat of vaporization of the refrigerant is provided by the fluid to be cooled;
   a desiccant contained within the first desiccant chamber and the second desiccant chamber configured to adsorb the vapor generated by the vaporization of the refrigerant;
   an energy source for causing the vapor in the desiccant to be desorbed;
   a condenser for cooling and condensing the vapor for use as the refrigerant in the at least one heat exchanger;
   at least one valve that reconfigures the first desiccant chamber for operation in the recharging mode once the first desiccant chamber adsorbs a certain amount of the vapor; and
   at least one valve that reconfigures the second desiccant chamber for operation in the cooling mode, wherein the second desiccant chamber is reconfigured contemporaneously with the reconfiguration of the first desiccant chamber so that the cooling process of the fluid to be cooled is maintained.

2. The system of claim 1, wherein the desiccant is amorphous silica gel, diatomaceous earth, calcium aluminosilicate clay, molecular sieves, activated carbon, hydrous aluminum silicate, or combinations thereof.

3. The system of claim 2, wherein the hydrous aluminum silicate is a zeolite.

4. The system of claim 3, wherein the zeolite is analcime, chabazite, heulandite, natrolite, phillipsite, stilbite, or combinations thereof.

5. The system of claim 1, wherein the desiccant is housed in a desiccant cartridge of the desiccant chamber.

6. The system of claim 5, wherein the desiccant cartridge is removable.

7. The system of claim 5, wherein the desiccant cartridge has a circular cross section.

8. The system of claim 1, wherein the energy source is heat.

9. The system of claim 8, wherein the heat is solar heat, waste engine heat or an auxiliary heating unit.

10. The system of claim 1, wherein the energy source is applied to the desiccant via a heat sink.

11. The system of claim 1, wherein the heat sink is a tube dispersed in the zeolite.

12. The system of claim 11, wherein the tube further comprises rings.

13. The system of claim 1, wherein the first desiccant chamber or the second desiccant chamber further comprises a perforated sieve configured to maintain the zeolite in the first desiccant chamber or the second desiccant chamber.

14. The system of claim 1, wherein the first desiccant chamber and the second desiccant chamber further comprises at least one perforated tube configured to facilitate the movement of desorbed vapor to the condenser.

15. The system of claim 1, wherein the system is operated at a partial vacuum.

16. The system of claim 15, wherein a vacuum pump is used to evacuate the system prior to or during operation.

17. A modular air conditioning system comprising:
   a heat exchanger module having at least one heat exchanger with a refrigerant, wherein the refrigerant comprises water;
   an adsorption module having:
      a first desiccant chamber initially configured to operate in a cooling mode;
      a second desiccant chamber initially configured to operate in a recharging mode, wherein the cooling mode provides for the adsorption of a vapor and the recharging mode provides for the desorption of the vapor;
      a first valve that reconfigures the first desiccant chamber for operation in the recharging mode once the first desiccant chamber adsorbs a certain amount of the vapor; and
      a second valve that reconfigures the second desiccant chamber for operation in the cooling mode, wherein the second desiccant chamber is reconfigured contemporaneously with the reconfiguration of the first desiccant chamber so that the cooling process of the fluid to be cooled is maintained, wherein a heat of vaporization of the refrigerant is provided by the fluid to be cooled; and
   a condenser module having at least a condenser for cooling and condensing the vapor for use as the refrigerant in the heat exchanger module.

18. The modular system of claim 17, wherein the desiccant is amorphous silica gel, diatomaceous earth, calcium aluminosilicate clay, molecular sieves, activated carbon, or hydrous aluminum silicate, or combinations thereof.

19. The modular system of claim 18, wherein the hydrous aluminum silicate is a zeolite.

20. The modular system of claim 19, wherein the zeolite is analcime, chabazite, heulandite, natrolite, phillipsite, stilbite, or combinations thereof.

21. The modular system of claim 17, wherein the adsorption module further comprises an energy inlet for heating the desiccant to cause the vapor adsorbed in the desiccant to be desorbed.

22. The modular system of claim 17, wherein the adsorption module further comprises a coolant inlet, wherein the coolant is used in the condenser to cool and condense the vapor.

23. A method for providing cooling of a fluid, comprising:
operating a first desiccant chamber in cooling mode to adsorb a vapor generated by the expansion of a refrigerant, wherein the refrigerant comprises water;
operating a second desiccant chamber in a recharging mode by heating the desiccant to desorb the vapor; and
switching the operation of the first desiccant chamber to a recharging mode once the first desiccant chamber has adsorbed a certain amount of the vapor and contemporaneously switching the operation of the second desiccant chamber to a cooling mode so that the cooling of the fluid is maintained, wherein a heat of vaporization of the refrigerant is provided by the fluid to be cooled.

24. The method of claim 23, further comprising cooling and condensing the vapor that is desorbed.

25. The method of claim 23, wherein the desiccant is zeolite and the refrigerant is water.

26. The method of claim 23, further comprising a third desiccant chamber operating in the cooling mode, the recharging mode or a standby mode.

* * * * *